(12) United States Patent
Dudar

(10) Patent No.: US 11,846,242 B2
(45) Date of Patent: Dec. 19, 2023

(54) METHODS AND SYSTEM FOR OVERCOMING A DEGRADED PARTICULATE FILTER PRESSURE SENSOR

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/646,777

(22) Filed: Jan. 3, 2022

(65) Prior Publication Data

US 2023/0212995 A1    Jul. 6, 2023

(51) Int. Cl.
| | | |
|---|---|---|
| *F01N 3/00* | (2006.01) | |
| *F02D 41/02* | (2006.01) | |
| *F02P 5/15* | (2006.01) | |
| *F01N 3/023* | (2006.01) | |
| *F01N 11/00* | (2006.01) | |

(52) U.S. Cl.
CPC ........... *F02D 41/029* (2013.01); *F01N 3/023* (2013.01); *F01N 11/002* (2013.01); *F02P 5/1502* (2013.01); *F01N 2430/08* (2013.01); *F02D 2200/0802* (2013.01)

(58) Field of Classification Search
CPC ........... F02D 41/029; F02D 2200/0802; F01N 3/023; F01N 11/002; F01N 2430/08; F02P 5/1502
See application file for complete search history.

(56) References Cited

U.S. PATENT DOCUMENTS

| | | | |
|---|---|---|---|
| 6,941,750 B2 | 9/2005 | Boretto et al. | |
| 8,424,295 B2* | 4/2013 | Bidner | F01N 3/023 |
| | | | 60/297 |
| 10,550,781 B2* | 2/2020 | Suchta | F02D 41/1448 |
| 11,060,437 B2 | 7/2021 | Dudar | |
| 2003/0188518 A1* | 10/2003 | Itoyama | F02D 41/029 |
| | | | 55/282.3 |
| 2006/0032217 A1* | 2/2006 | Kondou | F01N 9/002 |
| | | | 60/297 |
| 2006/0225409 A1* | 10/2006 | Kuboshima | F01N 11/002 |
| | | | 60/297 |
| 2007/0144146 A1* | 6/2007 | Kusatsugu | F01N 11/00 |
| | | | 60/285 |
| 2007/0277509 A1* | 12/2007 | Tahara | F01N 9/002 |
| | | | 60/286 |
| 2008/0034738 A1* | 2/2008 | Singh | F01N 11/002 |
| | | | 60/285 |
| 2008/0294329 A1* | 11/2008 | Noda | F02D 41/146 |
| | | | 701/112 |

(Continued)

FOREIGN PATENT DOCUMENTS

| | | |
|---|---|---|
| EP | 1464818 A1 | 10/2004 |
| WO | 2014183998 A1 | 11/2014 |

*Primary Examiner* — Matthew T Largi
(74) *Attorney, Agent, or Firm* — Vincent Mastrogiacomo; McCoy Russell LLP

(57) ABSTRACT

Systems and methods for operating an engine that includes an exhaust system with a carbonaceous soot trap described. In one example, a carbonaceous soot load estimate for the carbonaceous soot trap is performed when a differential pressure sensor is degraded. The carbonaceous soot estimate may be performed when the engine is not rotating.

17 Claims, 4 Drawing Sheets

(56) References Cited

U.S. PATENT DOCUMENTS

| | | | |
|---|---|---|---|
| 2012/0227381 A1* | 9/2012 | Oemke | F01N 13/009 |
| | | | 60/277 |
| 2013/0074481 A1* | 3/2013 | Miura | F01N 9/002 |
| | | | 60/311 |
| 2018/0094556 A1* | 4/2018 | Kurtz | F01N 3/027 |
| 2019/0048777 A1* | 2/2019 | Rollinger | F01N 11/002 |
| 2019/0234337 A1 | 8/2019 | Dudar | |
| 2020/0088119 A1 | 3/2020 | Suchta et al. | |

* cited by examiner

METHODS AND SYSTEM FOR OVERCOMING A DEGRADED PARTICULATE FILTER PRESSURE SENSOR

FIELD

The present description relates to methods and a system for assessing a state of a particulate filter even in the presence of degradation of a particulate filter pressure sensor.

BACKGROUND AND SUMMARY

A vehicle may include a carbonaceous soot trap, which may be referred to as a particulate filter, to store carbonaceous soot that may be generated by the engine during some conditions. For example, carbonaceous soot may be generated when the engine is cold started. The carbonaceous soot may accumulate in the carbonaceous soot trap over time. The amount of soot that accumulates in the carbonaceous soot trap may be referred to as the "soot load" of the carbonaceous trap. If the soot load of a carbonaceous trap in a vehicle is large, the vehicle may suffer from drivability issues. In addition, engine emissions may increase. Therefore, it may be desirable to purge a carbonaceous soot trap before the soot load is large. On the other hand, if the soot trap is purged of carbonaceous soot to frequently, fuel consumption may increase, thereby reducing vehicle fuel efficiency. For these reasons, it may be desirable to purge the carbonaceous soot trap after the soot load exceeds a threshold level.

One way to estimate the soot load may be to measure a pressure differential across a carbonaceous soot trap. If the pressure differential across the carbonaceous soot trap exceeds a threshold, the carbonaceous soot trap may be purged. However, it may be possible for the pressure sensing system including the pressure sensor to degrade. For example, a hose that links the pressure sensor to a sensing port in the exhaust system may disconnect, leads of the pressure sensor may become disconnected, or other conditions that may influence the integrity of the pressure reading. As such, there may be times when a pressure sensing system may not be sufficient to determine an operating state of a carbonaceous soot trap. Therefore, it may be desirable to provide alternative ways of assessing an operating state of a carbonaceous soot trap.

The inventor herein has recognized the above-mentioned issues and has developed a method for operating an engine, comprising: purging a carbonaceous soot trap in response to output of a pressure sensor during a first condition; and purging the carbonaceous soot trap in response to output of a temperature sensor during a second condition.

By purging a carbonaceous soot trap in response to an output of a pressure sensor during a first condition, and purging the carbonaceous soot trap in response to output of a temperature sensor during a second condition, it may be possible to purge the carbonaceous soot trap based on pressure data determined during vehicle operation so that the carbonaceous soot trap may be purged expeditiously. On the other hand, if the pressure sensor data is not as may be expected, the carbonaceous soot trap may be purged at a later time based on an exhaust temperature while an engine is stopped. In these ways, the carbonaceous soot trap may be purged based on loading of the carbonaceous soot trap even when pressure data may not be as may be expected.

The present description may provide several advantages. In particular, the approach may an engine to operate in a desired way even though a carbonaceous soot trap pressure sensor may not be providing expected output. Further, the approach may improve customer satisfaction by maintaining a desired level of vehicle operation even when output of a pressure sensor may not be as expected. In addition, system robustness may be preserved without increasing system cost.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
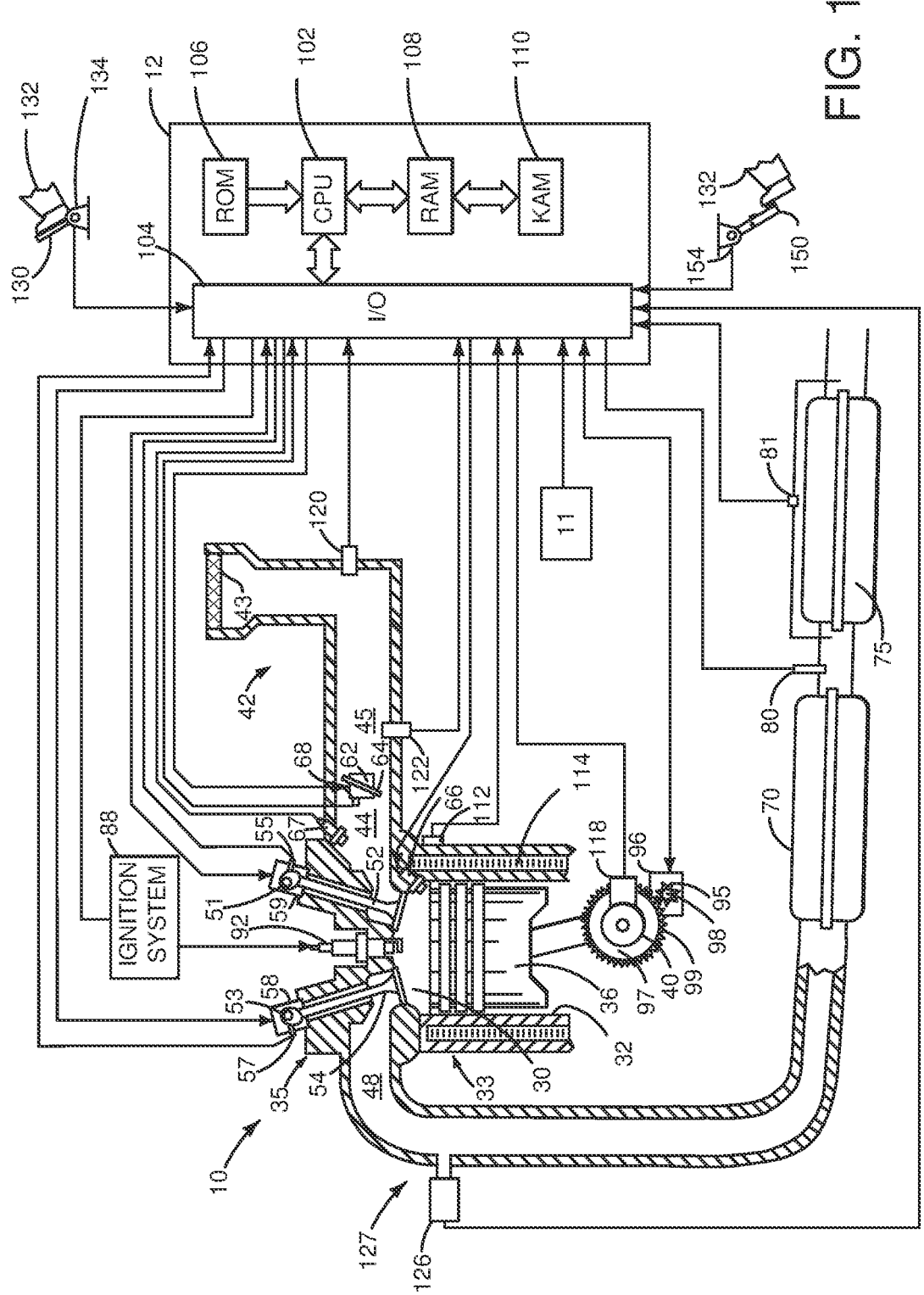
FIG. 1 is a schematic diagram of an engine.
Figure 2B:
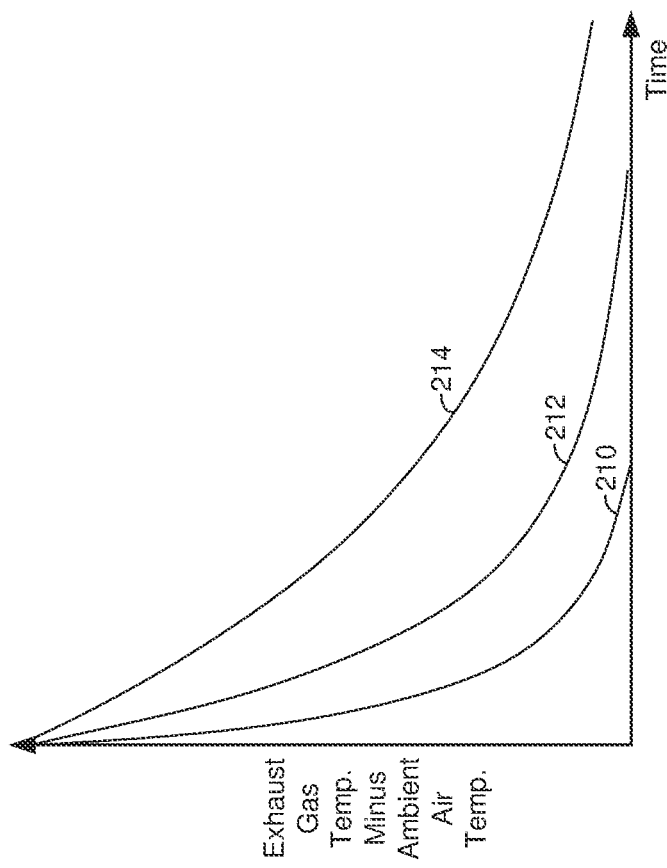
FIGS. 2A and 2B illustrate plots showing how exhaust temperature may be related to loading of a carbonaceous soot trap.

The present description is related to operating an engine and purging of a carbonaceous soot trap that is included in an exhaust system of the engine. Carbonaceous soot may accumulate in the carbonaceous soot trap as a vehicle ages. The vehicle may include a diesel engine or a gasoline engine as shown in FIG. 1. Temperature in an exhaust system when an engine of the vehicle is stopped may be correlated to an amount of carbonaceous soot that is stored in a carbonaceous soot trap as indicated by the plots in FIGS. 2A and 2B. A vehicle may be operated as shown in the sequence of FIG. 3 according to the method of FIG. 4.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller 12 employs the actuators shown in FIGS. 1 and 2 to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. For example, intake valve 52 may be held open or held closed for an entire cycle (e.g., two revolutions) of engine 10. Likewise, exhaust valve 54 may be held open or held closed for an entire cycle of engine 10. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

Optional electronic throttle 62 adjusts a position of throttle plate 64 to control air flow to intake manifold 44 from air intake 42. Air filter 43 may clean air entering air intake 42. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Combustion gases may exit engine 10 and enter exhaust system 127. Exhaust system 127 includes an exhaust manifold, a universal exhaust gas oxygen (UEGO) sensor 126, a three-way catalyst 70, a temperature sensor 80, a differential pressure sensor 81, and a carbonaceous soot trap 75. The exhaust sensor 126 is located upstream of three-way catalyst 70 according to a direction of exhaust gas flow. In some examples, a two-state exhaust gas oxygen sensor may be substituted for UEGO sensor 126. Three-way catalyst 70 may include multiple bricks.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface 11 may be a touch screen display, pushbutton, key switch or other known device. A remote server or other data processing device 133 may broadcast weather data including geographic areas that may be flooded to controller 12.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a system, comprising: an engine; an exhaust system coupled to the engine, the exhaust system including a differential pressure sensor and a temperature sensor; a carbonaceous soot trap included in the exhaust system; and a controller including executable instructions stored in non-transitory memory that cause the controller to estimate a loading of the carbonaceous soot trap via the temperature sensor in response to an indication of degradation of the differential pressure sensor. In a first example, the system further comprises additional instructions to estimate a loading of the carbonaceous soot trap via the differential pressure sensor. In a second example that may include the first example, the system further comprises additional instructions to purge the carbonaceous soot trap in response to the loading exceeding a threshold. In a third example that may include one or more of the first and second examples, the system further comprises additional instructions to increase exhaust gas temperature of the engine via adjusting spark timing to purge the carbonaceous soot trap. In a fourth example that may include one or more of the first through third examples, the system includes where degradation of the differential pressure sensor is based on output of the differential pressure sensor. In a fifth example that may include one or more of the first through fourth examples, the system further comprises additional instructions to hold exhaust valves of the engine fully closed when the engine is stopped in response to the indication of degradation of the differential pressure sensor. In a sixth example that may include one or more of the first through fourth examples, the system further comprises additional instructions to monitor output of the temperature sensor when the engine is stopped.

Figure 2A:
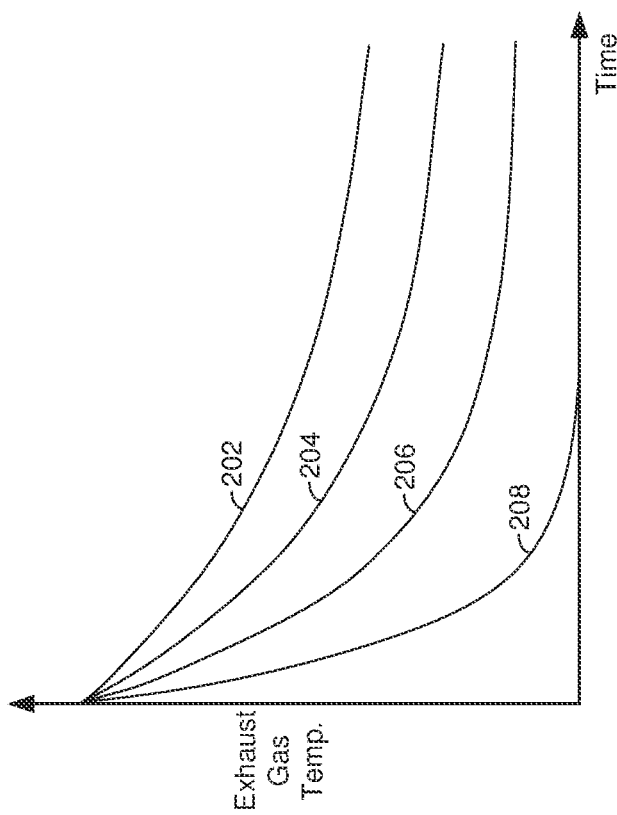
Figure 3:
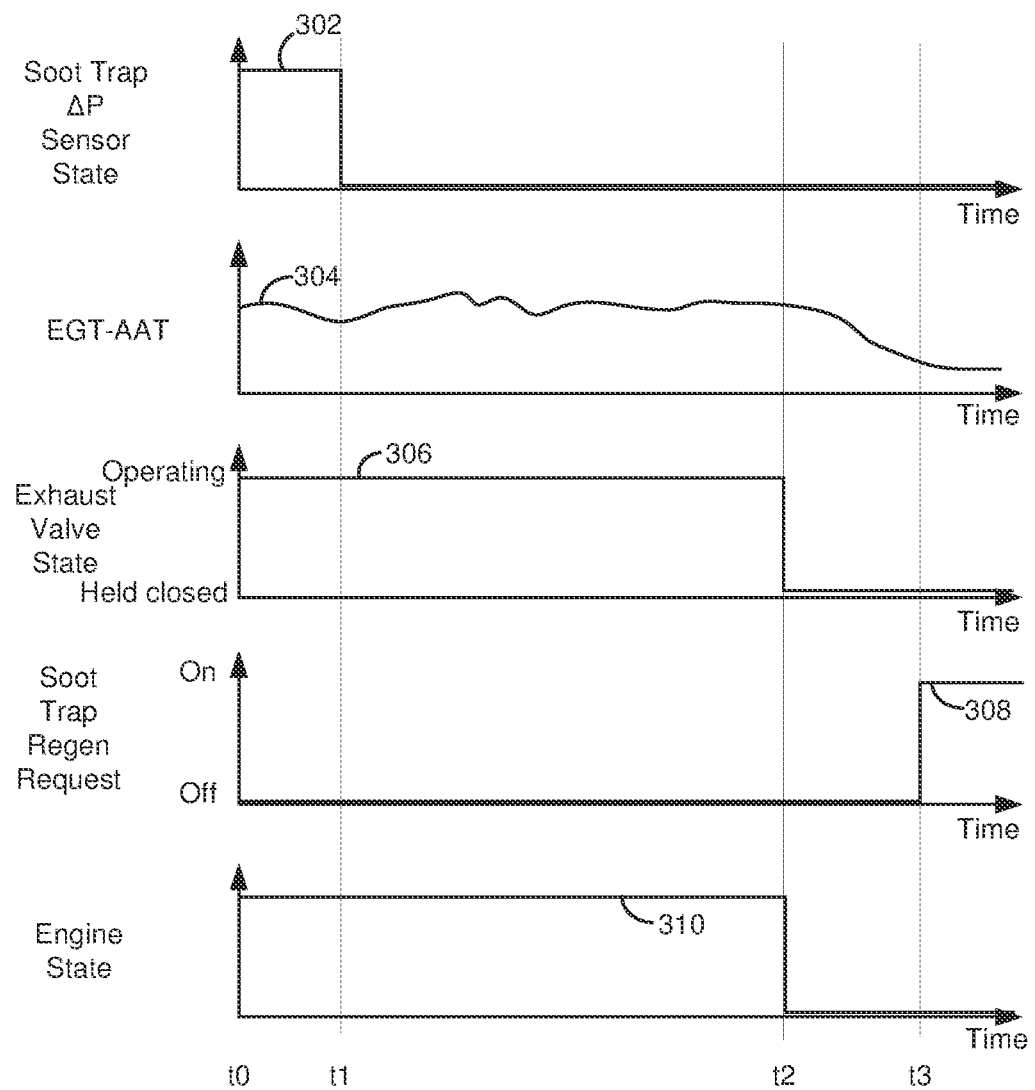
FIG. 3 shows example sequence for determining when to regenerate a carbonaceous soot trap.

Referring now to FIG. 2A, a plot of exhaust gas temperature versus time is shown. The vertical axis represents exhaust gas temperature, and exhaust gas temperature increases in the directly of the vertical axis arrow. The horizontal axis represents time and time increases from the left side of the figure to the right side of the figure. Combustion ceases and the engine is stopped rotating at the time where the vertical axis intersects with the horizontal axis.

FIG. 2A includes curves 202-208. These curves represent exhaust gas temperature in an exhaust system of a stopped engine for various ambient air temperatures. The exhaust temperatures at the time of engine stop are identical for each of the ambient temperatures.

Curve 208 describes exhaust gas temperature trajectory for an exhaust system of an internal combustion engine that has been stopped beginning at a starting exhaust gas temperature (e.g., 200 degrees Fahrenheit (° F.)) and ending at an ambient temperature of 40° F. Curve 206 describes exhaust gas temperature trajectory for an exhaust system of an internal combustion engine that has been stopped beginning at a starting exhaust gas temperature (e.g., 200 degrees Fahrenheit (° F.)) and ending at an ambient temperature of 60° F. Curve 204 describes exhaust gas temperature trajectory for an exhaust system of an internal combustion engine that has been stopped beginning at a starting exhaust gas temperature (e.g., 200 degrees Fahrenheit (° F.)) and ending at an ambient temperature of 80° F. Curve 202 describes exhaust gas temperature trajectory for an exhaust system of an internal combustion engine that has been stopped beginning at a starting exhaust gas temperature (e.g., 200 degrees Fahrenheit (° F.)) and ending at an ambient temperature of 100° F. Thus, it may be observed that exhaust gas temperature in an exhaust system decays toward ambient air temperature. In addition, the rate of temperature decay may be a function of ambient air temperature. These temperature curves may be repeatable for an engine that is stopped with all of its exhaust valves in a closed state.

Referring now to FIG. 2B, a plot of exhaust gas temperatures minus ambient air temperature versus time is shown. The vertical axis represents exhaust gas temperatures minus ambient air temperature, and exhaust gas temperatures minus ambient air temperature increases in the directly of the vertical axis arrow. The horizontal axis represents time and time increases from the left side of the figure to the right side of the figure. Combustion ceases and the engine is stopped rotating at the time where the vertical axis intersects with the horizontal axis. The engine is stopped with all of its exhaust valves in a closed position. Closing the exhaust valves when the engine is stopped permits exhaust to flow only through the carbonaceous soot trap, and a greater amount of soot stored in the carbonaceous soot trap may tend to keep exhaust temperature higher for a longer period of time as is shown by curves 210-214. Curves 210-214 begin at a same temperature on the left side of the plot.

Curve 210 describes exhaust gas temperature trajectory for an exhaust system of an internal combustion engine that includes a clean (e.g., zero carbonaceous soot load) and that has been stopped beginning at a starting exhaust gas temperature minus ambient temperature. Curve 212 describes exhaust gas temperature trajectory for an exhaust system of an internal combustion engine that includes a half loaded (e.g., loaded to 50% of carbonaceous soot storage capacity of the soot trap) and that has been stopped beginning at a starting exhaust gas temperature minus ambient temperature. Curve 214 describes exhaust gas temperature trajectory for an exhaust system of an internal combustion engine that includes a fully loaded (e.g., loaded to 100% of carbonaceous soot storage capacity of the soot trap) and that has been stopped beginning at a starting exhaust gas temperature minus ambient temperature.

Thus, curve 210 approaches zero (e.g., exhaust gas temperature minus ambient temperature=0) much sooner than curves 212 and 214. The "clean" or unloaded soot trap may let exhaust gases flow toward ambient temperature with less restriction due to a lower soot load than a soot trap that is 50% or 100% loaded. Convective cooling allows cooler air to flow into the exhaust system and warmer air to flow from the exhaust system. Thus, the loading of a carbonaceous soot trap may be estimated according to a rate of temperature decay of gases in the exhaust system. The faster the rate of temperature decay, the lower the soot load in the carbonaceous soot trap. In addition, since the curves shown in FIG. 2B are a function of exhaust gas temperature minus ambient air temperature, the effect of ambient air on temperature in the exhaust system is factored into the curves shown in FIG. 2B.

Figure 4:
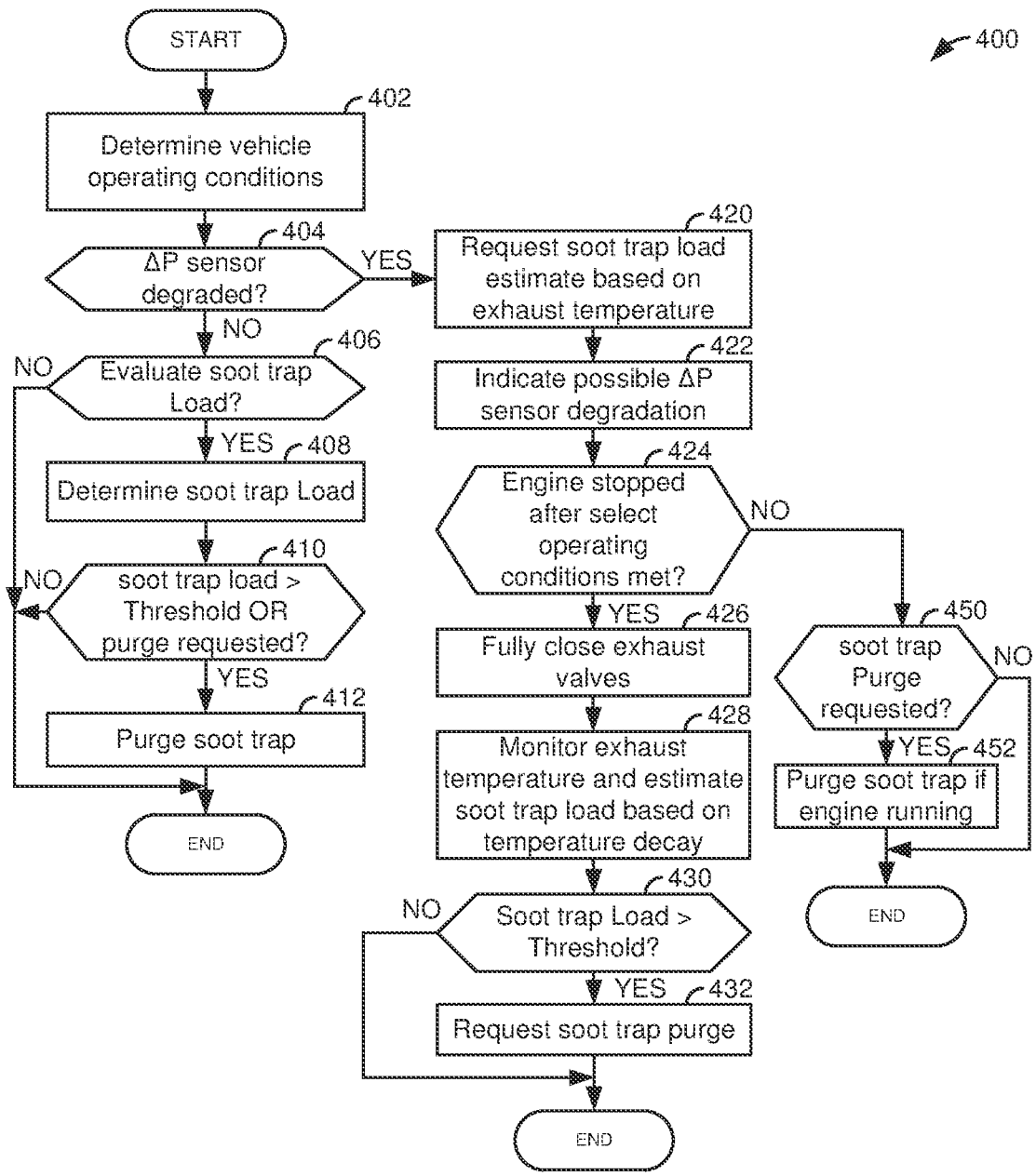
FIG. 4 shows a flowchart of a method for operating an engine.

Referring now to FIG. 3, an example vehicle operating sequence according to the method of FIG. 4 is shown. The operating sequence may be performed via the system of FIG. 1 in cooperation with the method of FIG. 4. Vertical lines at times t0-t3 represent times of interest during the sequence. The plots of FIG. 3 are time aligned.

The first plot from the top of FIG. 3 is a plot of a carbonaceous soot trap differential pressure sensor operating state versus time. The vertical axis represents the carbonaceous soot trap differential pressure sensor operating state and the carbonaceous soot trap differential pressure sensor operating state is nominal or operating as expected when trace 302 is at a higher level near the vertical axis arrow. The carbonaceous soot trap differential pressure sensor operating state is degraded or no operating as expected when trace 302 is at a lower level near the horizontal axis. The horizontal axis represents time and time increases from the left side of the plot to the right side of the plot.

The second from the top of FIG. 3 is a plot of exhaust gas temperature (EGT) minus ambient air temperature (AAT) versus time. The vertical axis represents the exhaust gas temperature minus ambient air temperature and the exhaust gas temperature minus ambient air temperature increases in the direction of the vertical axis arrow. The horizontal axis represents time and time increases from the left side of the figure to the right side of the figure. Trace 304 represents the exhaust gas temperature minus ambient air temperature.

The third from the top of FIG. 3 is a plot of engine exhaust valve operating state versus time. The vertical axis represents the engine's exhaust valves operating state and the engine's exhaust valves are operating and/or operational when trace 306 is at a higher level near the vertical axis arrow. The engine's exhaust valves are not operational when trace 306 is at a lower level near the horizontal axis. The engine's exhaust valves are held in a closed state when the exhaust valves are not operational. The horizontal axis represents time and time increases from the left side of the figure to the right side of the figure. Trace 306 represents the engine exhaust valve operating state.

The fourth from the top of FIG. 3 is a plot of a carbonaceous soot trap regeneration request state versus time. The vertical axis represents the carbonaceous soot trap regeneration request state and carbonaceous soot trap regeneration is requested when trace 308 is at a higher level near the vertical axis arrow. A carbonaceous soot trap regeneration request is not present when trace 308 is at a lower level near the horizontal axis. The horizontal axis represents time and time increases from the left side of the figure to the right side of the figure. Trace 308 represents the carbonaceous soot trap regeneration request state.

The fifth from the top of FIG. 3 is a plot of engine operating state versus time. The vertical axis represents the engine operating state and the engine is operating (e.g., rotating and combusting fuel) when trace 310 is at a higher level near the vertical axis arrow. The engine is not rotating and combusting fuel when trace 310 is at a lower level near the horizontal axis. The horizontal axis represents time and time increases from the left side of the figure to the right side of the figure. Trace 310 represents the engine operating state.

At time t0, the engine is operating and the carbonaceous soot trap differential pressure sensor is operating as expected. The exhaust gas temperature minus ambient air temperature is at a middle level and the engine's exhaust valves are operating. The carbonaceous soot trap regeneration request is not asserted.

At time t1, the carbonaceous soot trap differential pressure sensor state indicates that the carbonaceous soot trap differential pressure sensor has entered a degraded state. The engine continues to operate and the exhaust gas temperature minus ambient air temperature remains near a middle level. The engine's exhaust valves continue operating and the carbonaceous soot trap regeneration request is not asserted.

At time t2, the engine is stopped and the carbonaceous soot trap differential pressure sensor state continues to indicate that the carbonaceous soot trap differential pressure sensor is in a degraded state. The engine's exhaust valves are all closed in response to the degraded state of the carbonaceous soot trap differential pressure sensor and exhaust gas temperature minus ambient air temperature is monitored to determine the load of the soot trap since the differential pressure sensor is degraded.

At time t3, the decay rate of exhaust gas temperature minus ambient air temperature is determined and the soot load of the carbonaceous soot trap (not shown) is determined to be greater than a threshold amount of soot. Therefore, the carbonaceous soot trap regeneration request is asserted. The engine remains stopped and the carbonaceous soot trap may be purged of soot when the engine is restarted. The engine's exhaust valves remain in a closed state, but they may be reactivated in response to an engine start request or after the state of the soot trap is known. The exhaust gas temperature minus ambient air temperature has decayed to a lower level.

In this way, an operating state of a carbonaceous soot trap may be estimated after a differential pressure sensor degrades. The carbonaceous soot trap may be purged of soot by increasing exhaust gas temperature and oxidizing soot in the soot trap. The engine may exhibit a desired level of performance and the vehicle may remain with a desired level of drivability during such conditions.

Referring now to FIG. 4, a flow chart of a method for operating an engine with a carbonaceous soot trap in an exhaust system coupled to the engine is shown. The method of FIG. 4 may be incorporated into and may cooperate with the system of FIG. 1. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions. Vehicle operating conditions may include but are not limited to carbonaceous soot differential pressure sensor output, ambient temperature, exhaust temperature, engine speed, vehicle speed, engine temperature, engine load, and driver demand torque or power. Method 400 may determine one or more vehicle operating conditions from data that is received to a controller. Method 400 proceeds to 404.

At 404, method 400 judges if the carbonaceous soot differential pressure sensor is in a degraded state. Method 400 may judge whether or not the carbonaceous soot differential pressure sensor is in a degraded state according to output of the sensor or output of other sensors. For example, if output of the carbonaceous soot differential pressure sensor is zero, method 400 may determine that the carbonaceous soot differential pressure sensor is degraded. If method 400 judges that the carbonaceous soot differential pressure sensor is in a degraded state, the answer is yes and method 400 proceeds to 420. Otherwise, the answer is no and method 400 proceeds to 406.

At 406, method 400 judges whether or not evaluation of the carbonaceous soot trap load is desired. The carbonaceous soot trap load may be evaluated at predetermined operating time intervals, driving distance intervals, or responsive to vehicle operating conditions such as an actual total number of cold engine starts since a most recent purge of the carbonaceous soot trap. If method 400 judges that conditions are present for evaluating the loading of the carbonaceous soot trap, the answer is yes and method 400 proceeds to 408. Otherwise, the answer is no and method 400 proceeds to exit.

At 408, method 400 estimates the soot load of the carbonaceous soot trap based on a pressure drop or differential across the carbonaceous soot trap. In one example, method 400 determines a pressure drop across the carbonaceous soot trap via a sensor and converts the pressure drop value to a soot load estimate for the carbonaceous soot trap via a empirically determined function: Soot_load=$f$(delta_p), where Soot_load is the soot load for the carbonaceous soot trap, $f$ is an empirically determined function that returns a soot load value, and delta_p is the pressure differential across the carbonaceous soot trap. Method 400 proceeds to 410.

At 410, method 400 whether or not the soot load of the carbonaceous soot trap is greater than a threshold soot load amount (e.g., 75% of the soot capacity of the soot trap). If so, the answer is yes and method 400 proceeds to 412. Otherwise, the answer is no and method 400 proceeds to exit.

At 412, method 400 purges soot from the carbonaceous soot trap. In one example, method 400 retards engine spark timing to increase engine exhaust temperature. In addition, method 400 may operate engine cylinders lean of stoichiometry to provide excess oxygen so that soot that is stored in the carbonaceous soot trap may be oxidized. The increased exhaust gas temperature and excess oxygen may facilitate oxidation of soot stored in the carbonaceous soot trap. Method 400 proceeds to exit.

At 420, method 400 requests an estimate of loading of the carbonaceous soot trap based on exhaust gas temperature. Method 400 does not estimate soot trap loading based on exhaust temperature when the engine is running. Therefore, method 400 may wait until the engine stops rotating and combusting fuel before estimating the soot load based on exhaust gas temperature. Method 400 proceeds to 422.

At 422, method 400 indicates possible degradation of the differential pressure sensor. Method 400 may indicate the degradation via a human/machine interface or via sending a message to a remote server. Method 400 proceeds to 424.

At 424, method 400 judges if the engine is stopped and not combusting after other select operating conditions have been met. The other select operating conditions may include but are not limited to the engine reaching a predetermined temperature and catalyst temperature reaching a predetermined temperature. If method 400 judges that the engine is stopped and that a request for a load estimate of the particulate filter based on exhaust gas temperature and other select conditions is met, the answer is yes and method 400 proceeds to 426. Otherwise, the answer is no and method 400 proceeds to 450.

At 426, method 400 may close one or more engine exhaust valves to reduce convective cooling of exhaust gases in the exhaust system by preventing air and exhaust flow through the engine. In one example, method 400 closes all exhaust valves of a cylinder bank to prevent gases from flowing through the engine, thereby limiting flow of air and exhaust through the carbonaceous soot trap. Closing the exhaust valves may improve repeatability of carbonaceous soot load estimates. Method 400 proceeds to 428.

At 428, method 400 monitors exhaust gas temperature and an amount of time since the engine was most recently stopped. Method 400 also may determine a temperature profile or a time constant of a curve that most closely fits the present trajectory of exhaust temperature.

In one example, method 400 may determine a time constant for the present exhaust temperature decay based on the following equation: $Etemp = a \cdot e^{t/t_c}$, where Etemp is an exhaust temperature in a present exhaust temperature profile, a is exhaust temperature at the time of engine stop minus ambient air temperature at time of engine stop, t is a particular time after engine stop during the course of the present exhaust temperature profile, and tc is a time constant that describes the trajectory of exhaust gas temperature. The time constant tc may be determined via adjusting the time constant until a curve of Etemp values matches the present exhaust temperature profile. Once the time constant is determined, it may be compared to one or more time constants that are stored in controller memory to determine the soot loading of the carbonaceous soot trap. For example, if the time constant that is determined from exhaust temperature is equal to a time constant that is stored in controller memory that represents a time constant for exhaust temperature when a carbonaceous soot trap is loaded to 35% of capacity, then the present soot capacity of the carbonaceous soot trap may be estimated to be 35%.

In another example, method 400 may compare a trajectory or profile of exhaust temperature determined during the present engine stop to curves of exhaust temperature profiles that have been saved to controller memory. The carbonaceous soot trap loading may be determined from the stored curve that most closely matches the present exhaust temperature trajectory. For example, if the present exhaust temperature profile most closely matches or follows an exhaust gas temperature profile or curve stored in controller memory for a soot trap that is 50% loaded, then the soot trap may be determined to be 50% loaded. Method 400 proceeds to 430.

At 430, method 400 judges whether or not the presently estimated carbonaceous soot trap load is greater than a threshold soot load. If so, the answer is yes and method 400 proceeds to 432. Otherwise, the answer is no and method 400 proceeds to exit.

At 432, method 400 request purging of the carbonaceous soot trap. Since the engine is stopped, the carbonaceous soot trap purging may be delayed until the engine is restarted. Method 400 proceeds to exit.

At 450, method 400 judges whether or not purging of a carbonaceous soot trap is requested. Method 400 may also require that select operating conditions be met. For example, method 400 may permit purging of the soot trap once the engine reaches an operating temperature. If purging is request and if select conditions are met, the answer is yes and method 400 proceeds to 452. Otherwise, the answer is no and method 400 proceeds to exit.

At 452, method 400 purges the carbonaceous soot trap if the engine is rotating and combusting fuel. In one example, method 400 retards engine spark timing to increase engine exhaust temperature. In addition, method 400 may operate engine cylinders lean of stoichiometry to provide excess oxygen so that soot that is stored in the carbonaceous soot trap may be oxidized. The increased exhaust gas temperature and excess oxygen may facilitate oxidation of soot stored in the carbonaceous soot trap. Method 400 proceeds to exit.

In this way, exhaust gas temperature may be a basis for estimating soot load of a soot trap when a sensor or differential pressure sensing system is degraded. By purging the soot trap when soot load exceeds a threshold, it may be possible to maintain engine operation without a reduction in fuel economy when a sensor or sensing system may be degraded.

The method of FIG. 4 provides for a method for operating an engine, comprising: purging a carbonaceous soot trap in response to output of a pressure sensor during a first condition; and purging the carbonaceous soot trap in response to output of a temperature sensor during a second condition. In a first example, the method may include where the first condition is the pressure sensor not being degraded and where the second condition is the pressure sensor being degraded. In a second example that may include the first example, the method includes where the pressure sensor is determined to be degraded based on an output of the pressure sensor. In a third example that may include one or more of the first and second examples, the method includes where purging the carbonaceous soot trap includes heating the carbonaceous soot trap via the engine. In a fourth example that may include one or more of the first through third examples, the method further comprising estimating a carbonaceous soot load of the carbonaceous soot trap via the pressure sensor. In a fifth example that may include one or more of the first through fourth examples, the method further comprising estimating a carbonaceous soot load of the carbonaceous soot trap via the temperature sensor. In a sixth example that may include one or more of the first through fifth examples, the method includes where the carbonaceous soot load is based on a temperature when the engine is not activated. In a seventh example that includes one or more of the first through sixth examples, the method includes where the temperature is a temperature in an exhaust system.

The method of FIG. 4 also provides for a method for operating an engine, comprising: estimating loading of a carbonaceous soot trap while the engine is not rotating via a temperature sensor and a controller; and purging the carbonaceous soot trap in response to the estimated loading of the carbonaceous soot trap. In a first example, the method may include where the purging is performed after starting the engine. In a second example that may include the first example, the method further comprises closing exhaust valves of a cylinder in response to estimating loading of the carbonaceous soot trap. In a third example that may include one or more of the first and second examples, the method includes where the estimating loading of the carbonaceous soot trap is performed in response to an indication of degradation of a pressure sensor. In a fourth example that may include one or more of the first through third examples, the method includes where the pressure sensor is a differential pressure sensor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating an engine, comprising:
purging a carbonaceous soot trap in response to output of a pressure sensor during a first condition, where the first condition is the pressure sensor not being degraded;
purging the carbonaceous soot trap in response to output of a temperature sensor minus ambient temperature during a second condition, where the second condition is the pressure sensor being degraded; and
holding exhaust valves of the engine fully closed when the engine is stopped in response to an indication of degradation of the pressure sensor.

2. The method of claim 1, where the pressure sensor is determined to be degraded based on the output of the pressure sensor.

3. The method of claim 1, where purging the carbonaceous soot trap includes heating the carbonaceous soot trap via the engine.

4. The method of claim 3, further comprising estimating a carbonaceous soot load of the carbonaceous soot trap via the pressure sensor.

5. The method of claim 3, further comprising estimating a carbonaceous soot load of the carbonaceous soot trap via the temperature sensor.

6. The method of claim 5, where the carbonaceous soot load is based on a temperature when the engine is not activated.

7. The method of claim 6, where the temperature is a temperature in an exhaust system.

8. A system, comprising:
an engine;
an exhaust system coupled to the engine, the exhaust system including a differential pressure sensor and a temperature sensor;
a carbonaceous soot trap included in the exhaust system; and
a controller including executable instructions stored in non-transitory memory that cause the controller to estimate a loading of the carbonaceous soot trap via the temperature sensor in response to an indication of degradation of the differential pressure sensor, and additional instructions to hold exhaust valves of the engine fully closed when the engine is stopped in response to the indication of degradation of the differential pressure sensor.

9. The system of claim 8, further comprising additional instructions to estimate the loading of the carbonaceous soot trap via the differential pressure sensor.

10. The system of claim 8, further comprising additional instructions to purge the carbonaceous soot trap in response to the loading exceeding a threshold.

11. The system of claim 10, further comprising additional instructions to increase exhaust gas temperature of the engine via adjusting spark timing to purge the carbonaceous soot trap.

12. The system of claim 8, where degradation of the differential pressure sensor is based on output of the differential pressure sensor.

13. The system of claim 8, further comprising additional instructions to monitor output of the temperature sensor when the engine is stopped.

14. A method for operating an engine, comprising:
closing exhaust valves of the engine in response to an indication of degradation of a differential pressure sensor;
estimating loading of a carbonaceous soot trap while the engine is not rotating via a temperature sensor and a controller; and
purging the carbonaceous soot trap in response to the estimated loading of the carbonaceous soot trap.

15. The method of claim 14, where the purging is performed after starting the engine.

16. The method of claim 14, where the exhaust valves of the engine are closed while the engine is stopped.

17. The method of claim 14, where the estimating loading of the carbonaceous soot trap is performed in response to an indication of degradation of the pressure sensor.

* * * * *